(12) United States Patent
Viger et al.

(10) Patent No.: US 7,711,804 B2
(45) Date of Patent: May 4, 2010

(54) METHODS AND DEVICES FOR THE ASYNCHRONOUS DELIVERY OF DIGITAL DATA

(75) Inventors: Pascal Viger, Coesmes (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 1518 days.

(21) Appl. No.: 11/002,400

(22) Filed: Dec. 2, 2004

(65) Prior Publication Data

US 2005/0198118 A1 Sep. 8, 2005

(30) Foreign Application Priority Data

Dec. 2, 2003 (FR) .................................. 03 14147

(51) Int. Cl.
G06F 15/16 (2006.01)
G06F 15/173 (2006.01)
G06F 15/177 (2006.01)

(52) U.S. Cl. .................. 709/223; 709/203; 370/401; 345/428; 358/1.15

(58) Field of Classification Search ......... 709/217–228, 709/203; 707/104.1; 370/401; 345/428; 358/1.15
See application file for complete search history.

(56) References Cited

U.S. PATENT DOCUMENTS

| 6,070,184 | A | 5/2000 | Blount et al. ............... 709/200 |
|---|---|---|---|
| 6,577,311 | B1 * | 6/2003 | Crosby et al. ............... 345/428 |
| 7,028,050 | B1 * | 4/2006 | Rose ........................ 707/104.1 |
| 2002/0033844 | A1 * | 3/2002 | Levy et al. ................... 345/744 |
| 2003/0063771 | A1 | 4/2003 | Morris et al. ................ 382/100 |
| 2004/0184478 | A1 | 9/2004 | Donescu et al. ............. 370/462 |
| 2005/0044146 | A1 | 2/2005 | Nassor et al. ............... 709/205 |
| 2005/0044483 | A1 | 2/2005 | Maze et al. ............... 715/501.1 |
| 2005/0114386 | A1 | 5/2005 | Nassor et al. ............... 707/102 |
| 2005/0228753 | A1 | 10/2005 | Viger et al. .................. 705/51 |
| 2006/0001908 | A1 * | 1/2006 | Ohta ......................... 358/1.15 |
| 2008/0031267 | A1 * | 2/2008 | Imao ......................... 370/401 |

FOREIGN PATENT DOCUMENTS

EP 1 133 104 9/2001

\* cited by examiner

*Primary Examiner*—Haresh N Patel
(74) *Attorney, Agent, or Firm*—Fitzpatrick, Cella, Harper & Scinto

(57) ABSTRACT

The method of asynchronous delivery of digital data according to the invention is implemented in at least one server system and at least one client system connected via a network.

According to the method, at the time of a request for data coming from a client system, an item of context information (CINF) representing a first state of the client system on sending out the request is associated with the latter.

On delivering to the client system a response, the response incorporates the context information (CINF).

The client system is adapted to put itself in a second state analogous to the first state mentioned above, in accordance with the context information (CINF, CUID).

The method according to the invention provides context management enabling the user to associate the responses received with requests sometimes made well beforehand.

28 Claims, 7 Drawing Sheets

METHODS AND DEVICES FOR THE ASYNCHRONOUS DELIVERY OF DIGITAL DATA

FIELD OF THE INVENTION

The present invention generally concerns the distribution of digital data via a network.

More particularly, the invention concerns methods and devices for performing asynchronous delivery i.e. deferred in time, of digital data to client stations.

A favored but non-exclusive application of the present invention that is particularly worthwhile is the distribution of multi-resolution digital images.

BACKGROUND OF THE INVENTION

In a network, such as a telecommunications network, the asynchronous delivery of digital data is essentially distinguished from a synchronous service in that the response to a request may be temporarily stored on a dedicated server on the network before being sent to a client station.

The temporary storage of the response makes it possible to alleviate poor or limited connectivity of the client station or of a server having the resource or data requested.

Different methods and devices for asynchronous delivery of data are known in the state of the art.

Thus, document U.S. Pat. No. 6,070,184 describes a service for asynchronous delivery of data for a Web browser installed on a mobile apparatus such as a PDA or GSM telephone.

The client Web browser of the mobile apparatus connects itself temporarily or intermittently to a dedicated server on the Internet network. The function of the dedicated server is to relay a command received from the mobile apparatus to a remote server on the Internet network, to receive and store the response of the remote server and to inform the client Web browser of the availability of the response.

The development these last few years of distributed networks and systems of "peer-to-peer" (or P2P) type has favored the appearance of services for asynchronous delivery, in particular for digital images.

This is because, in P2P networks and systems, the client stations and the servers connect and disconnect periodically to the network. The direct availability of the data on the network is very random. The temporary storage of the images requested and their deferred delivery constitute a technical solution adapted to P2P technology.

Thus a system of P2P type for sharing multi-resolution digital images is known to the inventors in which original images at high resolution remain stored on local servers of the users (client machines) of the system. Low resolution versions of the images on the other hand are stored on a central server of the system and are directly available for the users. A certain quality of service is obtained by the availability on the central server of the low resolution versions of the images. However, a problem of availability remains for the original images, especially when the connectivity of the local servers holding these original images fluctuates or when the reproduction quality of the original images is low.

In order to solve this problem of availability of the original images at high resolution, it has been proposed to include a dedicated server for the original images in the above image sharing system. Deferred downloading of the original images is made onto the dedicated server from the client machines holding the images. The dedicated server next warns the requesting users of the availability of the original high resolution images.

Although the methods and devices for asynchronous delivery of digital data of the prior art described above have given satisfactory technical solutions at the time of their design, those methods and devices today merit being improved.

Thus, a point on which the prior art calls for improvement is the manner in which the responses to the requests of users are provided to them.

This is because the responses are provided to the users as raw information and the users experience some difficulty in associating the responses received with the requests sometimes made considerably earlier. For example, the users' machines may be in very different operating states on receipt of the responses, with respect to the states at the time of making the corresponding requests.

Another desirable improvement of the prior art concerns the processing reserved for successive requests from the same user.

When no specific processing has been planned, each of the requests is processed independently of the others, and the user receives the same number of response notifications as requests made. Thus, for example, if the user makes the same request twice by error, he will receive two response notifications even though a single one would suffice. Apart for the lack of user-friendliness, these multiple notifications generate additional traffic on the network which it would be desirable to reduce to a minimum.

The asynchronous delivery service according to U.S. Pat. No. 6,070,184 does offer a possibility of stringing together or grouping together of the responses according to preferences expressed by the user beforehand, but this solution is not satisfactory in all cases. This is because it requires a deliberate intervention by the user. Furthermore, the grouping together carried out is static, and no change is possible without further intervention by the user.

SUMMARY OF THE INVENTION

The object of the present invention is essentially to make the improvements indicated above to the prior art and to offer the advantages succinctly set out in the following pages.

The object of the present invention is firstly to provide a method of asynchronous delivery of digital data implemented in at least one server system and at least one client system connected via a network, the client system being capable of receiving deferred delivery of the digital data requested from the server system, comprising steps of:

associating with a request for data coming from the client system an item of context information representing a first state of at least a part of the requesting client system on sending out the request for data;

searching, on the basis of the request, for at least certain of the requested data in at least one of the systems connected to the network; and delivering to the requesting client system a response incorporating the context information, the requesting client system being adapted to put itself at least in part in a second state analogous to the first state in accordance with the context information.

In a complementary manner, the invention also concerns a device for asynchronous delivery of digital data incorporated in a distributed manner in at least one server system and at least one client system connected via a network, the client system being capable of receiving deferred delivery of the digital data requested from the server system, comprising:

associating means, incorporated in at least one client system, for associating with a request for data coming from a requesting client system an item of context information representing a first state of at least a part of the requesting client system on sending out the request for data;

searching means, incorporated in the server system, for searching, on the basis of the request, for at least certain of the requested data in at least one of the systems connected to the network; and delivery means, incorporated in the server system, for delivering to the requesting client system a response incorporating the context information, the requesting client system being adapted to put itself at least in part in a second state analogous to the first state in accordance with the context information.

According to another aspect, the object of the present invention is also to provide a method of asynchronous delivery of digital data implemented in at least one server system adapted to cooperate with at least one client system connected to the server system via a network, the client system being capable of receiving deferred delivery of the digital data requested from the server system, comprising steps of:

receiving a request for data coming from the client system and comprising an item of context information representing a first state of at least a part of the requesting client system on sending out the request for data;

searching, on the basis of the request, for at least certain of the requested data in at least one of the systems connected to the network; and delivering to the requesting client system a response incorporating the context information.

In a complementary manner, the invention also concerns an information processing device adapted to operate as a server system capable of cooperating with at least one client system connected to the server system via a network, the client system being capable of receiving deferred delivery of the digital data requested from the server system, comprising:

receiving means for receiving a request for data coming from the client system and comprising an item of context information representing a first state of at least a part of the requesting client system on sending out the request for data;

searching means for searching, on the basis of the request, for at least certain of the requested data in at least one of the systems connected to the network; and delivery means for delivering to the requesting client system a response incorporating the context information.

According to still another aspect, the object of the present invention is also to provide a method of requesting/receiving digital data implemented in a client system connected to at least one server system via a network, the client system being capable of requesting digital data from the server system and of receiving deferred delivery of the requested digital data after a search for them performed by the server system, comprising steps of:

on sending out the request for data:
generating an item of context information representing a first state of at least a part of the client system on sending out the request for data and associating the context information with the request for data sent out; and on receiving a response incorporating the context information coming from the server system:
putting at least a part of the client system in a second state analogous to the first state in reaction to the context information.

In a complementary manner, the invention also concerns an information processing device adapted to operate as a client system connected to at least one server system via a network, the client system being capable of requesting digital data from the server system and of receiving deferred delivery of the requested digital data after a search for the data performed by the server system, comprising at the sending end:
generating means for generating, on sending out the request for data, an item of context information representing a first state of at least a part of the client system on sending the request for data, and associating means for associating the context information with the request for data sent out; and at the receiving end:
means for context management for putting at least a part of the client system in a second state analogous to the first state in reaction to the context information incorporated in a response received from the server system.

The invention thus provides a first appreciable improvement to the prior art by providing context management enabling the user to associate the responses received with requests sometimes made well beforehand.

This is because, on processing of the response by the client system, the latter goes, at least in part, into a state analogous to that which prevailing at the time of formulating the request. It is thus possible to create a context for the user analogous to the context which existed at the time of the request. This homogeneity of contexts not only facilitates, in the mind of the user, association of the response received with a formulated request, but also permits the implementation of adequate resources and tools, which may be useful for the exploitation of the response.

The method according to the invention as defined above has the advantage of being able to be implemented in any type of network, of client-server type just as well as of P2P type. The method according to the invention is compatible with a communication infrastructure of wired or wireless type, supporting an Internet or private local network.

According to a feature, the search is preceded by a grouping together of successive requests for data coming from the same client system in the same first state in a single request for data on the basis of which the search is executed. Furthermore, the delivery of the response may be preceded by a grouping together of several responses to one or more requests for data coming from the same client system in the same first state into a single response to deliver to the same client system.

According to another feature, the grouping together of successive requests for data also comprises a function of deleting a possible redundancy in the successive requests for data.

The invention thus provides a second appreciable improvement to the prior art by permitting optimal management of the successive requests for data and of the successive responses at the central server.

The user-friendliness is increased since the user only receives one notification for several requests, and, in a complementary manner, the network traffic is reduced.

According to still another feature, the search for the requested data may be carried out in a database included in the server system. The search for the requested data may also be carried out at least in a local file server included in a client system other than the requesting client system.

According to one embodiment, the delivery of the data also comprises the sending the response or a part of it in the form of a notification indicating an availability of the requested data, and the notification comprises at least one link to a location where the requested data are available or partially available and/or at least one link to a set of higher order of which the requested data form part. For example, the notification comprises a part or the whole requested data.

The delivery of the data may also comprise loading into the requesting client system of the requested data or a part of them from one or more locations in the server system and/or at least one client system.

This particular embodiment succinctly described above is particularly adapted to digital data in the form of multi-resolution images. The data transmitted in the notification then comprise, for example, versions of low resolution of the images known as "thumbnails".

The invention provides embodiments that are entirely adapted to the processing of the data organized into sets of higher order such as albums, collections of images and/or catalogues.

In such a case, the first and second states comprise for example at least one screen display associated with the data and/or the execution of at least one computer program associated with the requested data and/or at least one screen display associated with the sets of higher order and/or the execution of at least one computer program associated with the sets of higher order.

The computer program may comprise a viewing interface program for example in the form of a dedicated program or an Internet type browser. The dedicated program is for example a program for management of collections of images.

According to other aspects, the invention also concerns a system, as well as a means for sharing information and a computer program for implementation of the methods of the invention described briefly above.

The invention thus provides embodiments adapted to the processing of data of multi-resolution type comprising in particular image data and/or video data and/or audio data and/or text data.

Other features and advantages of the present invention will appear more clearly on reading the description of particular embodiments which follows, this description being given solely by way of non-limiting example and being made with reference to the accompanying drawings.

DETAILED DESCRIPTION

The particular embodiments of the methods and devices of the invention presented below are described in the general context of a system according to the invention designed more particularly for the sharing of multi-resolution digital images between a group of users.

Naturally, the different features of the invention presented in the above preamble are independent from the type of digital data and apply without restriction to the particular embodiments described below.

Figure 1:
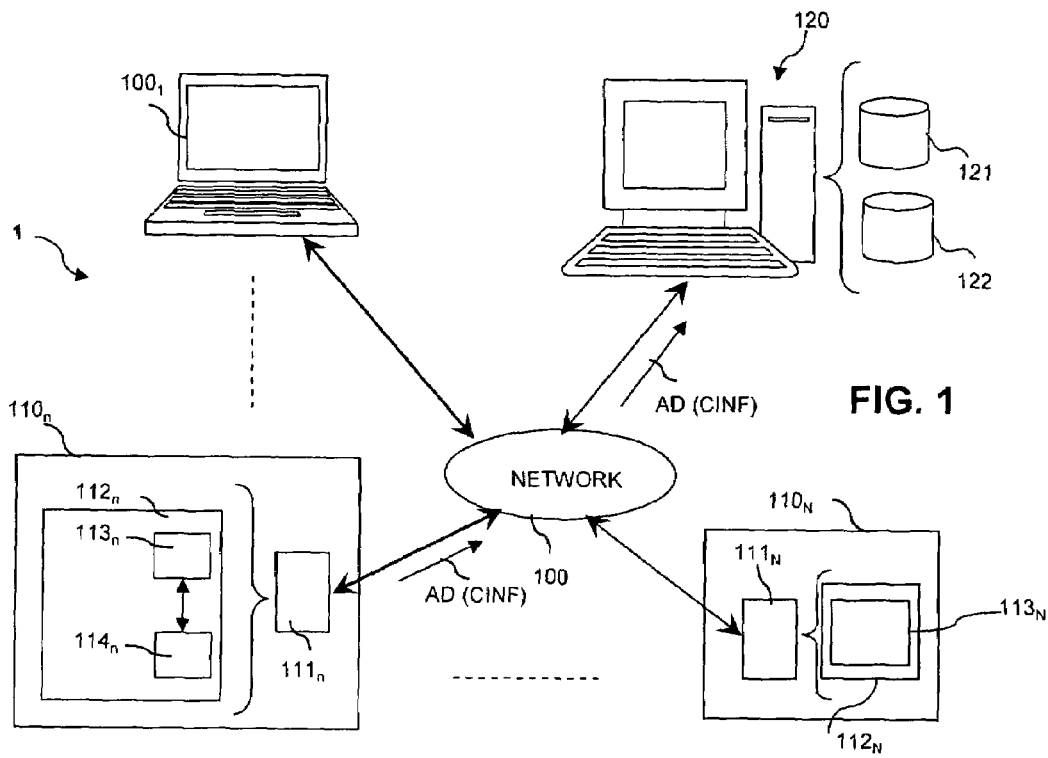
FIG. 1 shows the general structure of a particular embodiment of the system according to the invention.

In the system of the invention of which FIG. 1 gives a global representation, it will be noted first of all that:
- the digital data requested and delivered possibly in deferred manner are constituted by multi-resolution digital images;
- the digital images are grouped together in collections which form sets of higher order; and
- the context information representing the state of at least a part of a client system requesting a digital image comprises an item of information representing the collection on the basis of which the client system requests the digital image.

In order not to make the description of the invention unnecessarily involved, only digital images with two resolutions are considered here.

For the same reason, it is considered here that a client system is attributed to a single user. Naturally, the invention is not limited to this simple configuration which facilitates its description, and it is perfectly applicable in a multi-user context.

The digital image thus comprises here a low resolution version and a high resolution version.

The low resolution version of the digital image is termed "thumbnail" which is the term used in the following description. The high resolution version of the digital image is the original digital image and is termed "high resolution image" or image HR.

The high resolution images in this system of the invention are those which are essentially concerned by an asynchronous delivery. This is because it is considered that the system is equipped with a server system in which the thumbnails of the different shared collections are stored. The thumbnails are thus directly available.

Naturally, as will be clear to the person skilled in the art, the present invention is not dependent on the number of resolutions of the digital images and may process digital images having any number of resolutions.

Furthermore, the expression "multi-resolution image" must be broadly interpreted, since it refers here both to digital images having a multi-resolution format such as the JPEG2000 format, as well as to digital images having a mono-resolution format such as the JPEG format.

In the case of the mono-resolution format such as JPEG, the multi-resolutions are supported either by the construction of independent files corresponding to different sub-resolutions obtained from the same high resolution file, or by a file format such as FlashPix (registered trademark of the Kodak company) which stores several resolutions in the same file.

With reference to FIG. 1, the system according to this particular embodiment, generally designated by reference 1, comprises a network 100, for example a telecommunications network, N client systems $110_1$ to $110_N$, N being an integer at least equal to 1, a server system 120, and a device for asynchronous delivery of digital data according to the invention which is incorporated in a distributed manner over N client systems $110_1$ to $110_N$ and the server system 120.

The system 100 is for example the Internet network or a local area network (LAN). The network 100 connects together the client systems $110_1$ to $110_N$ and the server system 120. The server 100 here is a network capable of supporting connection modes of peer-to-peer and/or client-server type.

Client-server connections enable client systems 110 to access the server system 120 periodically.

Peer-to-peer connections enable client systems 110 to directly exchange digital images between themselves, independently of the server 120.

The client systems 110 are constructed around an information processing device or machine 111, typically a personal micro-computer, on which a computer program 112 is installed implementing the algorithms necessary for the implementation of the methods according to the invention.

The client systems 110 are connected to the network 100 by means of different known techniques, for example a DSL link, a 56 Kbits/s modem or a cable modem.

At the client system end 110 the computer program 112 implements the algorithms necessary for the implementation of the methods according to the invention.

The computer program 112 may have different aspects according to the design constraints imposed by the telecommunications system 1.

Thus the computer program 112 may take the form of a dedicated program, or, more simply, its function may be fulfilled by a standard Internet browser which may possibly be associated with a plug-in.

For example, the computer program 112 is downloaded onto a client system 110 from the server system 120 and is then installed on the client system 110.

As shown for the client system $110_n$ which is any client system 110 of the system 1, when a peer-to-peer connection mode is desired, the computer program $112_n$ may comprise, in addition to an image display interface $113_n$, a local file server $114_n$ whose operation is coupled with the interface $113_n$.

The local file server $114_n$ is of conventional type and will not be described here.

The image display interface $113_n$ is for example supported by a dedicated computer program manipulating image collections, albums, catalogues and the like.

According to a particular embodiment well adapted to connections of peer-to-peer type, the computer program 112 comprises two distinct processes adapted to communicate with each other. A first process manipulates the interface 113 and communicates with the local file server 114. A second independent process implements the local file server 114 which is executed as soon as the client system 110 is started.

According to a simpler embodiment, shown by way of example for the client system $110_N$ but which may be implanted in any one of the client systems 110, the function of the image display interface is fulfilled for example by a standard Internet browser $113_N$ with which a plug-in may possibly be associated.

When a strict client-server connection mode is desired, the computer program 112 may comprise as a minimum an Internet browser fulfilling the function of image display interface 113 and which connects itself to the server system 120 in order to allow viewing of the digital images shared on the network.

According to a peer-to-peer connection mode, the computer program 112, which has available to it as a minimum an Internet browser, can connect itself beforehand to the server system 120 and thus be redirected to at least one client system 110, each of these systems or their group enabling all or part of the content for viewing to be provided.

The server system 120 is preferably constructed around an information processing device or machine, typically a personal micro-computer, on which a computer program is installed implementing the algorithms necessary for the implementation of the methods according to the invention.

The server system 120 is adapted to communicate directly with the client systems 110.

As shown in FIG. 1, in this particular embodiment, the server system 120 comprises in particular a device 121 for storing volatile data and a database 122.

The device 121 for storing volatile data, also termed cache memory 121 in the following description, is adapted to store data with a long life such as images, but also data that are more volatile such as address lists, lists of asynchronous requests, etc., as will appear more clearly in the following description.

The database 122 permits easy and efficient management of the volatile data stored in the volatile data storage device 121. It is however to be noted that the database 122 is not an indispensable item in the invention and it is possible for it not to be present in certain embodiments of the invention.

According to a variant embodiment, the server system 120 comprises several servers coupled together and accessible on the basis of a single network address.

Figure 2:
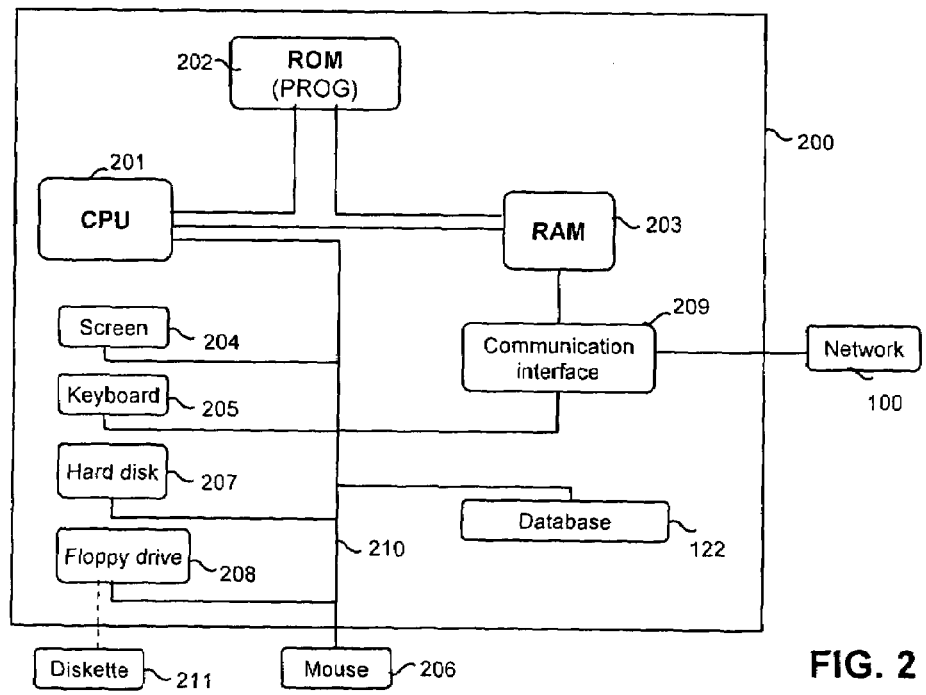
FIG. 2 shows a particular hardware configuration of a system for processing information according to the invention adapted to operate as a server system in the system of FIG. 1.

With reference to FIG. 2, a device or machine 200 for processing information adapted to operate as a server system 120 in the system 1 according to the invention will now be described essentially in terms of its hardware configuration.

The information processing device 200 is typically a micro-computer or a work station.

The information processing device 200 is equipped so as to provide, for example, a permanent connection to the network 100, in order to provide a continuous service.

In this particular embodiment, the information processing device 200 is totally dedicated to fulfilling the function of the server system 120 and executes one or more computer programs PROG which permit the implementation of the methods according to the invention at the server end.

According to a variant, the programs PROG are not installed in the device 200 of the server system 120, but are installed in the information processing device 111 of a client system 110 which executes them as background tasks. The information processing device 111 is then recognized as service provider by a central server of the system 1 which distributes this information to the other client systems 110.

As shown in FIG. 2, the information processing device 200 comprises a central processing unit (CPU) 201 such as a microprocessor, a non-volatile memory such as a read only memory ROM 202, a random access memory RAM 203, man-machine interface means such as a screen 204, a keyboard 205 and a mouse 206, means for information storage such as a hard disk 207 and a floppy drive 208, a communication interface 209 and an internal communication bus 210.

The information processing device 200 is also equipped with the database 122, which will be described in detail in what follows with reference to FIG. 5.

The ROM memory 202 may possibly comprise, in whole or in part, the programs PROG.

The RAM memory 203 contains registers adapted to record variables and parameters created and modified during the execution of the programs PROG. The RAM memory 203 also possibly comprises a temporary storage zone corresponding to the cache memory 121 to store volatile data exchanged on the network 100 transiting by the information processing device 200.

The hard disk 207 is optional and may possibly contain a part or the entirety of the programs PROG, as well as the cache memory 121.

The drive 208 is adapted to receive a diskette 211 and to read or write thereon data processed or to be processed in accordance with the methods according to the invention, The communication interface 209 is connected to the network 100 and is adapted to transmit and receive data.

The communication bus 210 permits communication and interoperability between the different elements included in the information processing device 200 or connected to it. The representation of the bus 210 shown in FIG. 2 is non-limiting. In particular, the central processing unit 201 is capable of communicating instructions to any element of the information processing device 200, directly or via another element of the device 200.

The executable code of the programs PROG is preferably stored on the hard disk 207 and/or in the ROM memory 202.

The diskette 211 can contain data as well as the executable code of the programs PROG which, once read by the apparatus 200, will be stored on the hard disk 207.

Furthermore, the executable code of the programs PROG may be received via the network 100, via the communication interface 209, in order to be stored on the hard disk 207.

The diskette 211 can be replaced by any information carrier such as a compact disc (CD-ROM) or a memory card.

In general terms, any information storage means, which can be read by a computer or microprocessor, integrated or not into the device 200, and which may possibly be removable, is capable of storing, in whole or in part, the programs PROG. Furthermore, the programs PROG may be loaded in whole or in part into one of the information storage means of the device 200 before being executed.

The central processing unit 201 controls and directs the execution of the instructions or portions of software code PROG, the instructions being stored on the hard disk 207 and/or the ROM memory 202 and/or in the other aforementioned information storage means.

On powering up, the program PROG stored in a non-volatile memory, such as the hard disk 207 or the ROM memory 202, are transferred in whole or in part into the RAM memory 203, which will then contains the executable code of the programs PROG, as well as registers for storing the variables and parameters necessary for the implementation of the methods according to the invention.

It is also to be noted that the device 200 may take the form of a programmed apparatus. This programmed apparatus then contains the executable code of the programs PROG, for example in fixed form in an application specific integrated circuit (ASIC).

Figure 3A:
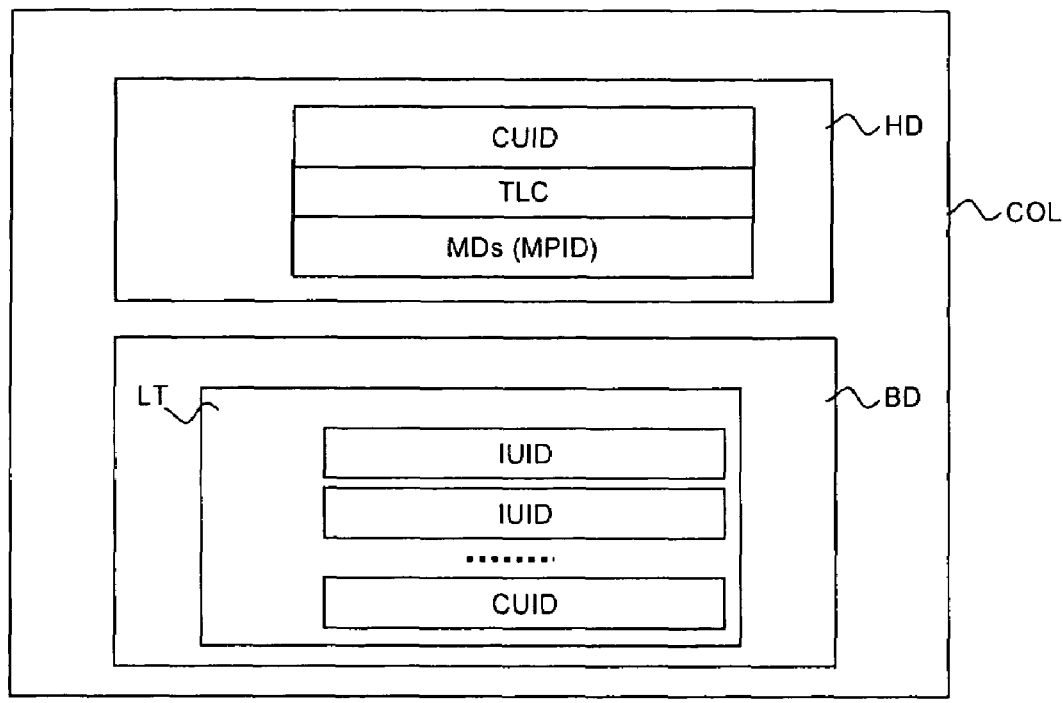
FIG. 3A represents a file structure of a collection of images on the basis of which asynchronous requests are sent out for images of high resolution in the system of FIG. 1.
Figure 3B:
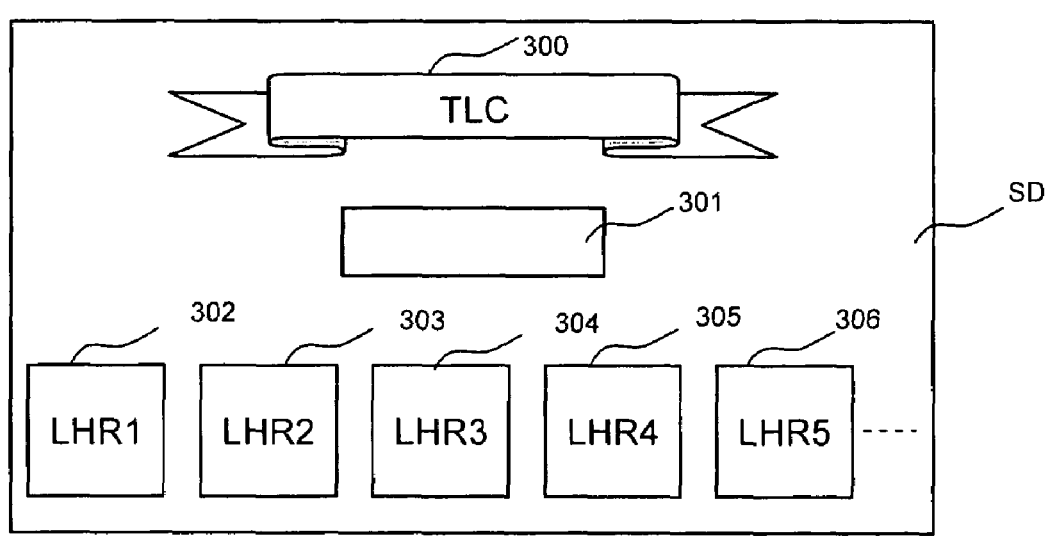
FIG. 3B shows an example of on-screen display of the collection of images of FIG. 3A.

With reference to FIGS. 3A and 3B, the general structure is described below of a file supporting a collection COL of digital images on the basis of which it is possible for a user to send out an asynchronous request for an image HR, as well as an example of display of a header page of the collection COL in a client system 110.

In general terms, a collection COL may be defined as a set of image and meta-data contents. By extension, a collection COL may contain other collections which will then be termed sub-collections.

As indicated earlier, the collection COL may be manipulated by a dedicated program, or more simply, it may be supported by one or more Web or HTML pages.

When an HTML page is employed for the collection COL, that page contains metadata necessary for the display of the page and links in particular to images to which are attributed image unique identifiers IUID. The image unique identifiers IUID in this case replace the conventional Web addresses.

As shown in FIG. 3A, a collection file comprises a header portion HD and a body portion BD.

The header portion HD contains the metadata comprising in particular a collection unique identifier CUID and a collection title TLC. Other items of metadata MDs may be incorporated in the header portion HD and relate for example to the presentation of the collection, the author of the collection, the date of creation of the collection, etc.

The presentation metadata describe for example the place of titles, comments, and tags, but also the background images, the colors, the frames of the images, the text fonts, etc. The presentation metadata may also more simply be constituted by a presentation model identifier MPID. The MPID then corresponds to a particular presentation model file in which the different elements constituting the presentation of the collection COL are defined.

When the collection COL is supported by HTML pages, a presentation file of CSS type as defined by the standardization organization W3C may be associated with the collection COL. The Internet browser of the client system 110 then displays an HTML page of the collection COL depending on the elements defined in the associated CSS file. The user of the client system 110 then has the possibility of easily modifying the original presentation of the collection COL by selecting a CSS file different from the original one for displaying the collection COL.

As also shown in FIG. 3A, the body portion BD comprises a list LT indicating the identifiers IUID of the images forming part of the collection COL.

The list LT may also contain identifiers CUID different from the CUID of the collection COL, which represent collections (or sub-collections) accessible on the basis of the current collection COL.

It will be noted that the thumbnail and the image HR both have the same identifier IUID in this embodiment. In order to make precise determination of an object, i.e. the thumbnail or the image HR, the identifier IUID is associated with a "type" of data.

The type of data is generally implicit according to the requests sent on the network. For example, the thumbnails are here required for example for viewing the header page of the collection COL. On the other hand, what is requested for viewing on the screen of a client system 110 is the image HR, or an image of intermediate resolution in a different embodiment of the invention.

An example of screen display SD of a header page of a collection COL comprising five images is shown in FIG. 3B.

It is considered here that the screen display SD is the one corresponding to an HTML page viewed by means of an Internet browser installed on a client system 110. The Internet browser is then for example connected to the server system 120 in order to download the HTML page and/or the thumbnails to display. The CUID and IUID identifiers are used for the downloading. In the case in which the HTML page and the thumbnails are available locally, the downloading by the Internet browser will take place from the local file server 114.

In the case in which all or certain parts of the HTML pages and/or thumbnails are not available locally, they may be downloaded from several client systems 110, or even the server system 120.

In the example of FIG. 3B, the screen display SD includes a title zone 300, a complementary display zone 301 and five thumbnail display zones 302 to 306.

The title metadata TLC is displayed in zone 300. Metadata indicating the author of the collection and the date of its creation are for example displayed in zone 301. Zones 302 to 306 display the thumbnails of the set of the digital images of the list of images LT.

Zones 302 to 306 contains URL links, LHR1 to LHR5, to the images HR.

When the user selects a thumbnail, for example by clicking on it, the LHR link is activated and a request is directed to the local file server 114 or the system server 120 according to the case. If the local file server 114 or the system server 120 detect that the image HR is not available on the network, the LHR link is interpreted as an asynchronous request AD and its execution is redirected to a recordal zone on the server system 120. The asynchronous request AD then takes the following form:

http://www.centralhost.com/gethighres?iuid=IUID&cuid=CUID&uui d=UUID where:

"iuid" is a keyword enabling the data item 'IUID' to be interpreted as representing the unique identifier of the shared image;

"cuid" is a keyword enabling the data item 'CUID' to be interpreted as representing the unique identifier of the shared collection;

"uuid" is a keyword enabling the data item 'UUID' to be interpreted as representing the unique identifier of the client system;

"centralhost.com" is the address of the server system; and

"gethighres" is the keyword for the acquisition command for the image HR.

The CUID identifier of the shared collection COL on the basis of which the asynchronous request AD is sent out is here the context information CINF which in accordance with the invention is associated with that request AD.

The identifier CUID represents the collection COL displayed on the screen of the client system 110 on sending out the asynchronous request AD. The identifier CUID thus represents a state of the screen on sending out the asynchronous request AD, or of a part of it when the collection COL is displayed for example in a reduced window. More generally, the identifier CUID represents a state of at least one part of the client system, i.e. here the screen display, but also the execution by the central processing unit of the information processing device 111 of the program producing such a screen display.

In accordance with the invention, other items of information may of course be introduced into the asynchronous request AD as context information CINF in order to better represent a state of the client system 110 or of a part of it on sending out the asynchronous request AD. Here, for example, in certain embodiments of the invention, the presentation file identifier MPID is for example associated with the identifiers IUID, CUID, UUID as supplementary context information CINF.

When the asynchronous request AD is not sent out from an Internet browser, it is possible to use known communication protocols, such as SOAP for example, between the local file server 114 and the server system 120, in order to relay the asynchronous request AD to the server system 120.

Figure 4:
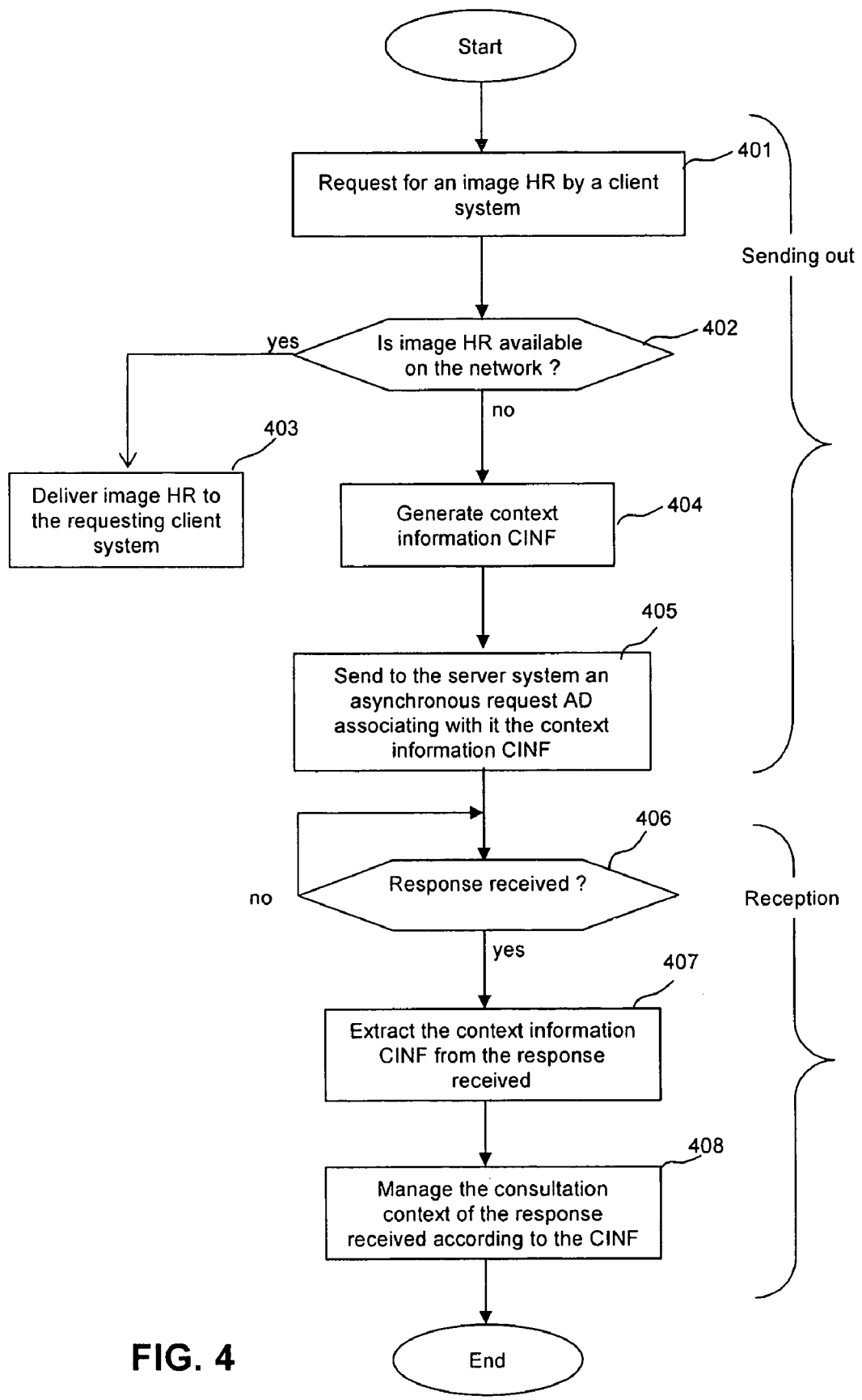
FIG. 4 is an algorithm showing the main steps of the method of requesting/receiving digital data according to the invention implemented in a client system connected to the system of FIG. 1.

With reference to FIG. 4 a general algorithm will now be described showing large operational steps of the method for requesting/receiving digital data according to the invention implemented in a client system 110.

The steps here have been deliberately separated from each other in time so as to make clearly apparent the different functions performed by the method of requesting/receiving digital data according to the invention.

In one practical embodiment, such as that presented above in the HTML domain and of which the description will continue with FIGS. 5 to 8, certain steps may possibly overlap.

Thus, for example, in the practical embodiment mentioned above in the HTML domain, the context information CINF=CUID is associated with a request for an image HR as from formulation of the request, before it is certain that the request will be processed as asynchronous.

In a different manner, steps 404 to 405 described below of the algorithm of FIG. 4 correspond to a subsequent association of the context information CINF with the request. The context information CINF is here associated with the request once it has been determined that the request will indeed be processed as an asynchronous request.

In a sending out part of the algorithm of FIG. 4, steps 401 to 405 are provided for managing the generation and sending out of an asynchronous request AD in a client system 110.

At step 401, a request for an image HR is made in the client system 110 by a user by clicking on one of the thumbnails displayed in the header page of a collection COL.

At step 402, the program 112 of the server system 110 determines whether the image HR requested is directly available or not.

In the affirmative, the image HR is available locally on the local file server 114 of the client system 110, in the server system 120 or in another peer client system 110 connected to the telecommunications system 1. Step 403 is then performed in order to display the image HR requested when it is available locally on the server 114, or to deliver it by uploading from the server system 120 or from a peer client system 110. In the above case, the delivery of the image HR occurs rapidly and the management of an item of context information in accordance with the invention is less worthwhile.

In the opposite case, that is to say when the image HR requested is not available, the request made at step 401 is managed as being an asynchronous request AD by the following steps 404 and 405.

Step 404 generates the context information CINF representing a request state of the client system 110 at the time of the request for the image HR at step 401, that is to say, in this particular embodiment, the display of the collection COL on the screen of the client system 110.

Step 405 associates the context information CINF generated at the request of step 401 in order to produce an asynchronous request AD. The request AD is next sent out to the server system 120 via the network 100.

In a reception part of the algorithm of FIG. 4, steps 406 to 408 are provided for receiving a response to an asynchronous request AD in the client system 110 and generating a context for consulting the response.

Step 406 is a step of awaiting a response from the server system 120, to the asynchronous request AD sent out.

This step is a non-active step, in the sense that the client system 110 no longer has to be concerned with what operations are to follow.

Figure 7:
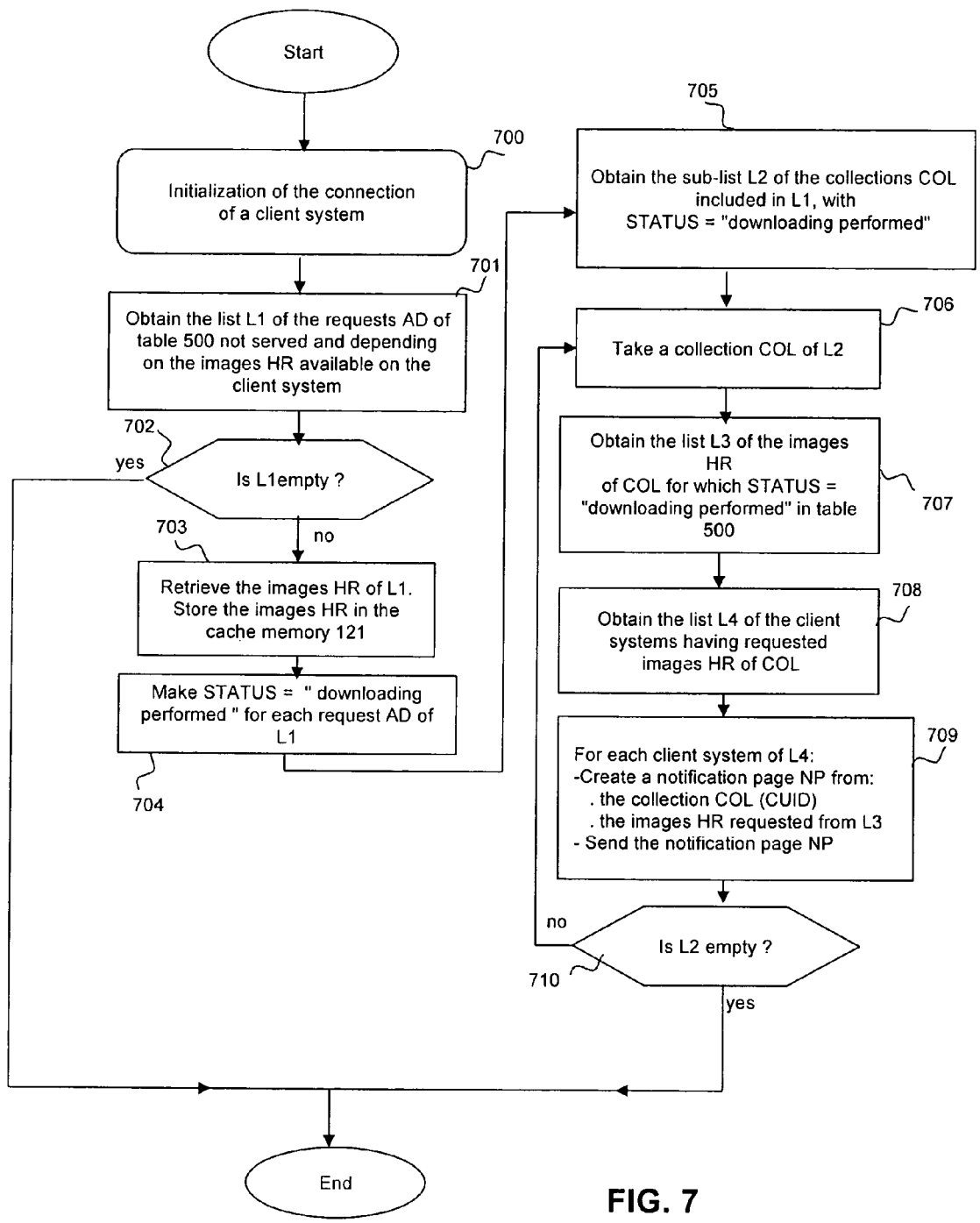
FIG. 7 is an algorithm showing other processing steps of the method of asynchronous delivery of digital data according to the invention implemented in the server system, from a step of connecting a client system to a step of sending out a response notification to the client system.

The client system 110 will be advised of the resumption of the procedure on reception of a notification comprising the response as described in step 709 of FIG. 7.

When a response is received, which, in accordance with the invention comprises the context information CINF, step 407 is executed to extract the context information CINF from the response received.

Step 408 utilizes the context information CINF extracted at step 407 to manage the context in which the response received is consulted in the client system 110.

More particularly, in this particular embodiment, at step 408 the context information CINF provides knowledge of the collection COL on the basis of which the corresponding asynchronous request AD was sent out, that is to say, of the state of the client system 110 at step 401. This knowledge enables the client system 110 to put itself in a state for consultation of the response that is analogous to its state at step 401. In other words, the client system 110 then presents a display screen for response consultation which reminds the user by its presentation of the collection COL on the basis of which he sent out his asynchronous request AD. Preferably, direct access to that collection COL is authorized from the display screen for response consultation.

Figure 5:
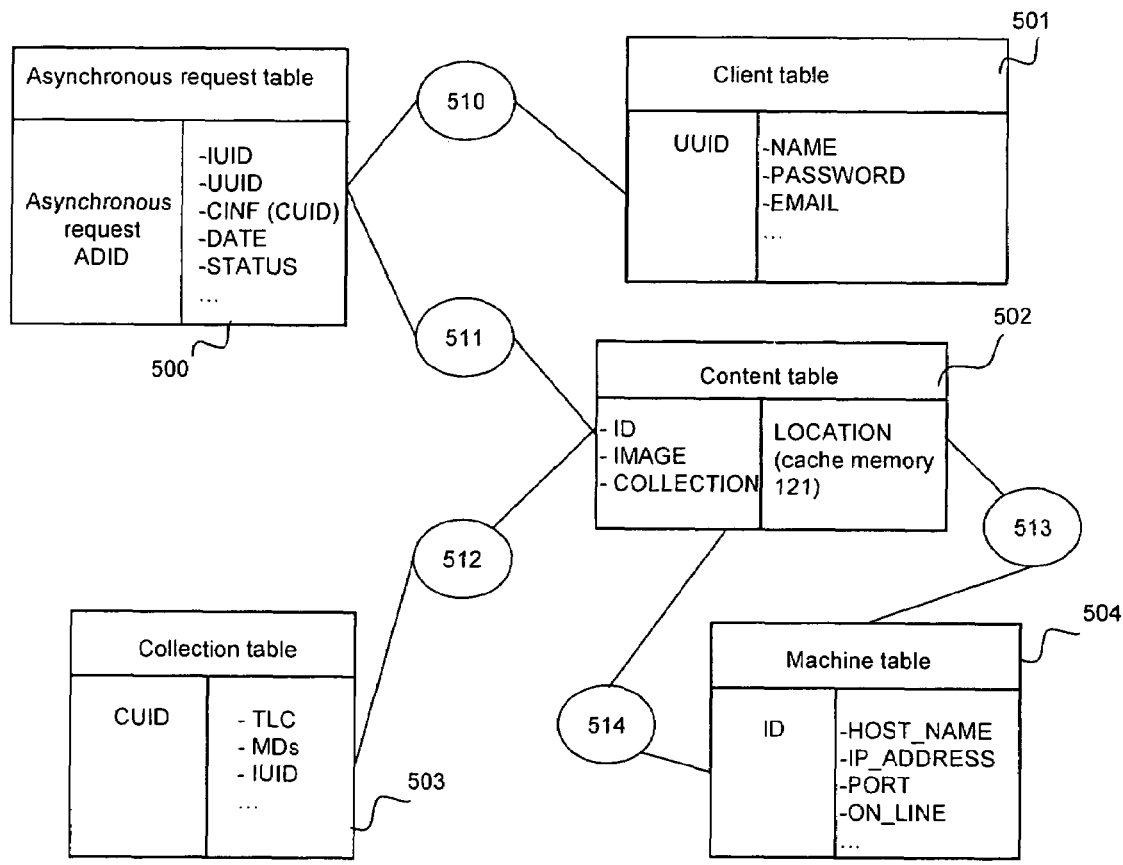
FIG. 5 shows an example of a structure for a database installed on the server system of the system of FIG. 1 for the implementation in that server system of the method of asynchronous delivery of digital data according to the invention.

With reference to FIG. 5, a particular structural organization is now described of the database 122 installed on the server system 120.

As will appear more clearly in the following description, the database 122 participates, in this particular embodiment of the system according to the invention, in the implementation of the method of asynchronous requesting of digital data according to the invention in the server system 120. It is to be noted that the database 122 is not an indispensable component in the present invention.

The database 122 essentially comprises an asynchronous request table 500, a client table 501, a content table 502, a collection table 503 and a machine table 504 between which different relationships 510 to 514 are established.

The function of the asynchronous request table 500 is essentially to keep, with respect to each asynchronous request AD received by the server system 120, items of information necessary for the processing of the request AD by the server system 120.

An identifier ADID is attributed by the server system 120 to each asynchronous request AD received from a client system 110.

For each asynchronous request AD received, the following items of information are in particular kept in corresponding fields of the asynchronous request table 500. the identifier IUID of the image HR requested, the identifier UUID of the requesting client system 110, the context information CINF (CUID), the date DATE of the asynchronous request AD and the status STATUS of the asynchronous request AD.

In order to simplify the description of this particular structural organization of the database 122, it is considered here that the context information CINF is limited to the identifier CUID of the client station COL on the basis of which the asynchronous request AD is made.

For reasons of convenience, the fields of tables 500 to 504 and their contents are designated in the same manner in what follows. Thus, for example, the field DATE is the field containing the item of information DATE.

In this embodiment, the fields DATE and STATUS may simply be chains of characters. The field DATE permits in particular a regular verification of the asynchronous requests AD that are waiting and a possible re-validation with the requesting client system 110. The field STATUS indicates that the corresponding asynchronous request AD is awaiting processing, in course of processing, in course of response notification to the requesting client system 110 or has been processed.

The fields IUID, UUID and CUID of table 500 constitute internal references to the database 122 which make it possible to point very efficiently to items of information of the other tables.

The function of the client table 501 is essentially to conserve the parameters of the accounts of the client systems 110 on the network. Table 501 is for example used on connection of a client system 110 for its authentication.

The content table 502 locally manages the resources such as the images, the collections and the stylesheets (presentations) available on the server system 110. An entry in table 502 has the form: identifier (ID), type (IMAGE, COLLECTION, etc.), LOCATION in the cache memory 121.

The relationship 510 between tables 500 and 501 makes it possible to know the asynchronous requests AD in course for each client system 110. Furthermore, when the processing of an asynchronous request AD has been terminated, the contact details of the user, for example his email address EMAIL, are easily located using tables 500 and 501 and the relationship 510.

The collection table 503 keeps the data of the collections COL. The data of a collection COL are those described above with reference to FIG. 3A, i.e. the identifier CUID and the title TLC of the collection COL as well as the identifiers IUID of the images of the collection COL.

According to a variant embodiment, the data of a collection COL are not stored in the database 122 but are kept in the cache memory 121 in the form of the collection file described with reference to FIG. 3A. It will not then be possible to find the links between a collection COL and the images belonging to that collection COL in the database 122 but directly from the corresponding collection file.

The relationship 512 makes it possible to link an entry of table 502, for example, the entry COLLECTION, to an entry of table 503. By means of the relationship 512, it is possible to obtain all the IMAGE entries of a collection COL. The association between the relationships 511 and 512 will be used for example to obtain the list of the images HR of a collection COL for which the server system 120 has transmitted to the client systems 110 responses to the asynchronous requests AD of the latter. The value of the above association of the relationships 511 and 512 will appear more clearly below in the part of the description relating to FIG. 7 (Step 707).

The machine table 504 keeps the parameters of the client systems 110 which are connected in peer-to-peer mode to the system 1 via their local file server 114. These parameters are, in non-limiting manner: A name of the host machine HOST_NAME, an IP Internet address IP_ADDRESS, a communication port PORT, an item of connection information ON_LINE of the machine, etc.

In the peer-to-peer mode, the server system 120 is more or less invoked by the client systems 110 according to the level of its knowledge of the data passing over the network.

Thus, according to a first embodiment, the server system 120 permanently keeps the location of the set of data in the system 1. In such a case, the relationship 513 between tables 502 and 504 is usable at any time to determine the location of the images HR in the system 1. When a client system 110 disconnects itself from the system 1, the information relating to the storage of the images on the local file server 114 of that client system 110 are kept and updated at the time the client system 110 next reconnects to the system 1.

According to another possible embodiment, the server system 120 does not have full knowledge of the architecture of the system 1. For example, in the most limiting case, the server system 120 only knows the data present in its cache memory 121. The server system 120 must then perform a search on the network in order to know the client systems 110 not connected which have the requested images HR. The relationship 513 between the tables 502 and 504 is not present in this embodiment.

The relationship 514 between tables 502 and 504 permits optimization of the system 1.

The relationship 514 serves to maintain the concept of link between the client system 110 and a requested image HR, which makes it possible to verify rapidly at each reconnection of the client system 110 whether an image HR must be transferred or not to the server system 120.

The relationship 514 thus optimizes the processing of the database 122 since it is not then necessary to launch a search in the whole table 500 and to compare the asynchronous requests AD that are waiting with a list of data that the local file server 114 provides at the time of a reconnection.

Relationship 514 is worthwhile even if the server system 120 must perform a search on the network, when relationship 513 does not exist. This is because the nature of this search is not urgent since the client system 110 liable to provide the requested image HR in principle is disconnected. Furthermore, with the relationship 514, the system 1 is more decentralized and the number of connections to the server system 120 across the network 100 is less. Preferably, the number of relationships 514 in the database 122 will however be limited to what is strictly necessary in order to not to burden the management of the database 122.

It will be noted that the relationships 513 and 514 are not equivalent and that relationship 514 does not replace relationship 513.

The use of relationship 514 is compatible with both embodiments mentioned above and respectively corresponds to the case in which the server system 120 permanently keeps the location of the set of data in the system 1 and the case in which the server 120 does not have full knowledge of the architecture of the system 1, respectively.

Figure 6:
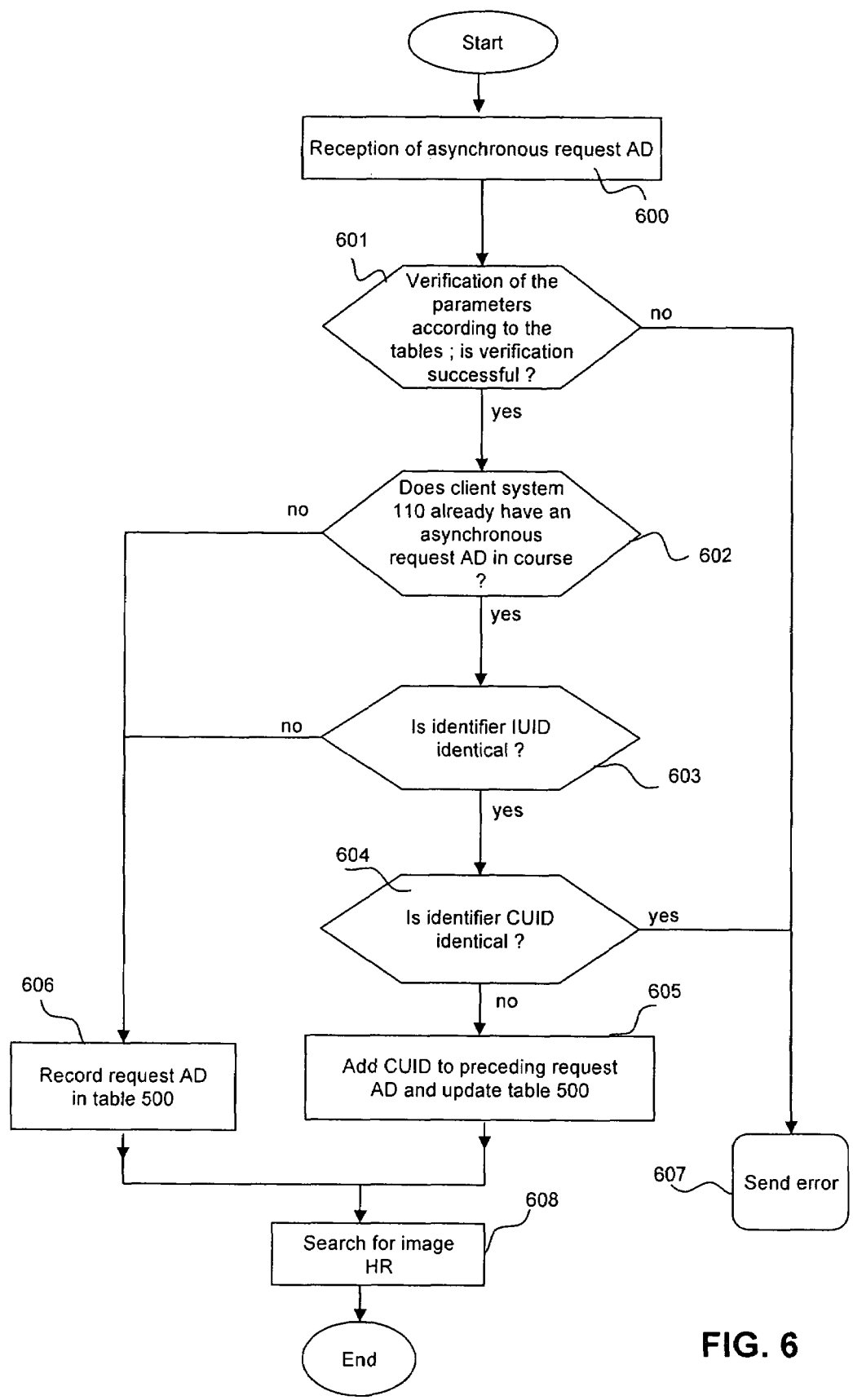
FIG. 6 is an algorithm showing the first processing steps of the method of asynchronous delivery of digital data according to the invention implemented in the server system, from a step of receiving an asynchronous request to a step of searching for a requested image.

With reference to FIG. 6, an algorithm will now be described which shows the operation of the server system 120 when an asynchronous request AD for an image IUID is sent out by a user going through a collection COL in a client system 110.

The different steps of the algorithm of FIG. 6 implement in the server system 120 the method of delivering digital data according to the invention.

Steps 600 and 601 make it possible to receive the asynchronous request AD and to verify, with the use of tables 500 to 504, the parameters transmitted to the server system 120. If an error is detected at step 601, an error message, step 607, is sent to the requesting client system 110.

At a step 602, determination is made of whether or not the asynchronous request AD received by the server system 120 follows on from a preceding asynchronous request AD still in course of the same client 110. For this, the identifiers UUID are compared.

In case of a negative result at step 602, the asynchronous request AD received is directly recorded in a new entry of table 500, with, as reference, the date of the asynchronous request AD received, step 606.

In case of a positive result at step 602, a step 603 is carried out.

At step 603, determination is made of whether the image HR forming the subject of the asynchronous request AD received has already been requested by the same client 110. For this, the identifiers IUID are compared.

In case of a negative result at step 603, that is to say if the high resolution image is not the subject of a preceding asynchronous request AD in course of the same client system 110, step 606 is carried out and a supplementary asynchronous request AD for the same client system 110, but for a different image, is recorded in table 500.

In case of a positive result at step 603, a step 604 is performed in order to complete the analysis of the asynchronous request AD received.

Step 604 makes it possible to determine whether the asynchronous request AD received from the client system 110 is actually different from the preceding asynchronous request AD in course for the same image HR. For this, the identifiers CUID are compared.

In case of a negative result at step 604, this means that the client system 110 is requesting the same image HR from a different collection COL. A step 605 is then carried out to update the table 500 in particular by adding the new CUID to the preceding asynchronous request AD. A grouping together is thus achieved of the two successive asynchronous requests AD coming from the same client 110 on the basis of the same collection COL.

In accordance with the invention, after a search performed by the server system 120, a response is sent to the client system 110 for each of the collections COL on the basis of which the image HR was requested. This feature is detailed in the part of the description relating to FIG. 7.

In case of a positive result at step 604, the asynchronous request AD received is identical to a preceding asynchronous request AD in course and is not then recorded in the table 500. An error message, step 607, is sent to the requesting client system 110.

For each asynchronous request AD recorded in table 500, a step 608 is next performed to search for client systems 110 capable of server the requested image HR. The searching step 608 is performed either directly on the basis of the relationships 513 of the database 122 if they exist, or by a search on the network.

At the issue of the search step 608, the relationships 514 are preferably updated.

Moreover, an updating step (not shown) of the relationships 514 is also carried out. Such an updating step occurs for example when the server system 120 is alerted of the appearance of modifications in the client systems 110 or when the server system 120 decides at regular intervals of time to perform new searches of the client systems 110 having the images HR requested.

With reference to FIG. 7, the delivery is now described of a response to an asynchronous request AD by the server system 120 when a client system 110 reconnects itself in peer-to-peer mode to the system 1.

The steps 700 to 704 successively process each of the asynchronous requests AD to serve of the client system 110 who reconnects to the system 1.

Steps 705 to 710 process the asynchronous requests AD as a function of the items of context information CINF=CUID written in the asynchronous requests AD in order to group together by collection COL the responses to deliver to the client system 110.

At step 700, the client system 110 which wishes to reconnect to the system 1 informs the server system 120 of its reconnection to the network 100 and of possible modifications that may have occurred in the images HR and collections COL which it contains.

Step 700 is thus a step of initialization of the reconnection.

Step 700 uses methods known in peer-to-peer networks in particular to verify the validity of the connection parameters (IP_ADDRESS, PORT) proposed by the local file server 114 of the client system 110 and for updating the table 504. In the case in which the server system 120 keeps the knowledge of all the images HR present in the system 1, the local file server 114 indicates to the server system 120 the images HR that are available on the client system 110 in order for the server system 120 to update relationship 513 between tables 502 and 504.

At step 701, the server system 120 obtains a list L1 of the images HR newly available (relationships 514) in the client system 110, due to the reconnection of the client system 110 to the system 1.

In the case in which the list L1 is empty, the algorithm terminates.

In the opposite case, the object of steps 703 to 704 is to retrieve the images HR newly available on the local file server 114 in order to download them into the cache memory 121 of the server system 120. Once the images HR have been downloaded into the cache memory 121, the STATUS fields of the corresponding asynchronous requests AD of table 500 are updated, STATUS="downloading performed", and the entries of the relationships 514 concerned may be deleted.

It is then possible to deliver responses to the requesting client systems 110.

It will be noted that the fields STATUS and DATE may be employed to efficiently manage the cache memory 121 of the server system 120. Thus, an image HR will only be deleted from the cache memory 121 a specific period after all the asynchronous requests AD relating to that image HR have given rise to a display or constitution of the image HR on the requesting client systems 110. Possibly, when the asynchronous requests AD are not deleted from the client systems 110 after consultation of the corresponding images HR, provision may be made for a service on the server system 120 in order to inform the client systems 110 concerned of the imminence of the destruction of the images HR in the cache memory 121.

Step 705 consists of determining, on the basis of the list L1, a sub-list L2 of collections COL to which only asynchronous requests AD correspond for which responses may be notified to the requesting client systems 110. The images HR to deliver in response to the asynchronous requests AD of the collections COL of the sub-list L2 are all available in the cache memory 121.

Steps 707 to 709 are next executed for each collection COL of list L2.

At step 707, a list L3 is determined of the images HR of the collection COL considered for which STATUS="downloading performed" in table 500.

At the time of a response notification to a client system 110, step 707 permits grouping together of a current image HR with images HR of the same collection COL in course of notification. The list L3 is obtained by a user using the relationships 511 and 512 in the database 122 in association.

Step 708 is provided in order to determine a list L4 of client systems 110 having requested an image HR of the collection COL in course.

At step 709, for each client system 110 of the list L4, a notification page NP is created for the images HR requested of the collection COL. The notification pages NP are next sent respectively to the client systems 110 listed in list L4.

In accordance with the invention, a response incorporating the context information CINF=CUID is thus delivered to the requesting client system 110. In this particular embodiment, the response of the server system 120 takes the form of the notification page NP.

In accordance with the invention, the requesting client system 110 is adapted to extract the context information CINF=CUID from the page NP received. The client system 110 next reacts to that information CINF to put itself at least in part in a state, that is to say, the display on screen of a page NP reproducing the presentation of the collection COL, which is analogous to the state on the basis of which the asynchronous request AD was sent out, that is to say, the display on screen of the collection COL.

The notification pages NP are for example sent by email to the addresses EMAIL kept in the table 501, via an instantaneous messaging system or a proprietary messaging system in the system 1.

In a particular embodiment, the email or other message containing the notification includes also one or several links, such as URLs, which give the address of the notification page NP on a web server, which could be either remote or local.

When the user clicks on such a URL, the software application related to the URL, such as web browser or dedicated viewer is launched if necessary and the notification page NP is displayed.

For example, if the URL embedded is related to the HTTP protocol, the URL could have the following form:

http://localhost:80/notif/CUID/IUID where "notif" is a key word for specifying a notification page NP, and CUID is the identifier of the collection COL. In that case, the default web browser may be launched from the mailer application in order to display the notification page.

In the case of proprietary protocol, the URL could have the following form:

"mp://notif/CUID/IUID"

where protocol "mp" is associated with a specific application installed on the machine. Under Microsoft Windows, when the user clicks on the URL from the email, a DDE (Dynamic Data Exchange) message is sent to the appropriate application which will be opened if necessary and will react, for example, by displaying the notification page NP.

The notification page NP may be the body of the message sent, or an attachment to a message of text or other type.

In the particular embodiment wherein the notification page NP is a page of HTML type, the notification page NP may thus be displayed by the Internet browser of the client system 110 depending on the technical characteristics of presentation described in the file CSS associated with the corresponding collection COL. Furthermore, on reception of the page NP by the recipient client system 110, the original file CSS of the collection COL may possibly be automatically replaced by another file CSS selected by the user for the display of the collection COL.

In the algorithm of FIG. 7 which has just been described, the notification page NP sent to a client system 110 may indicate the whole list L3 of the newly available images HR of the collection COL. The list L3 then comprises the images HR of the collection COL actually requested by the client system 110, but also other images HR of the same collection COL requested by other client systems 110 notified concomitantly. The images HR actually requested by the client system 110 receiving the notification page NP are, for example, differentiated from the other images HR in the display of the list L3.

Figure 8:
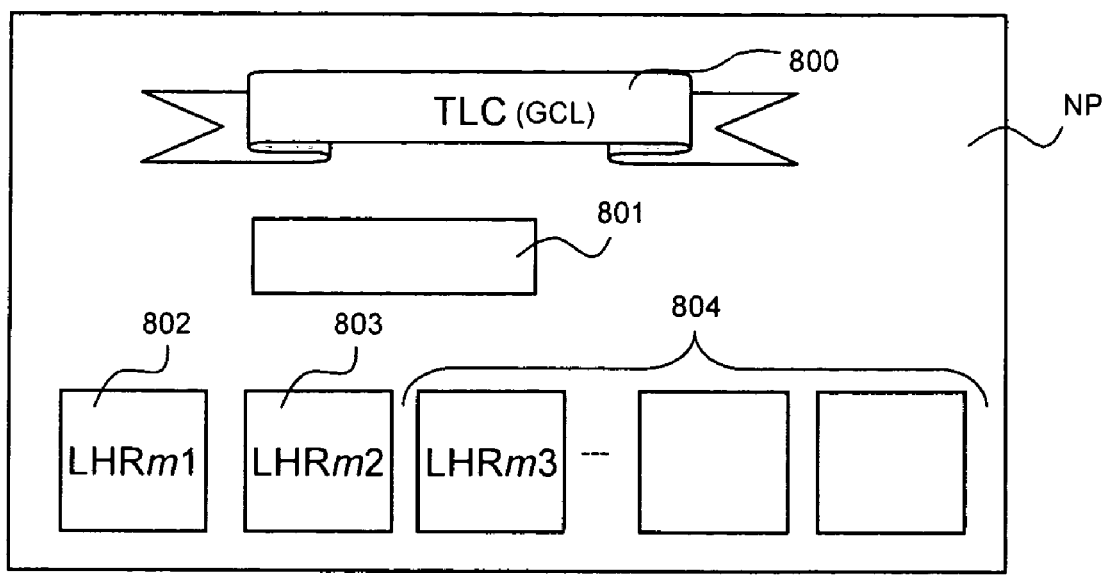
FIG. 8 shows an example of on-screen display of a response notification to a client system.

FIG. 8 represents a display screen example corresponding to the notification page NP in the client system 110.

In accordance with the invention, due to a display of the notification page NP analogous to the display of the collection COL (FIG. 4) on the basis of which the asynchronous request AD was sent, the user, on receiving a page NP, is brought into an environment which he perceives as being that of the collection COL. Analogous titles, comments, background images and decors facilitate such a perception.

Furthermore, the perception of the user is confirmed by the access offered to him to resources to which he had access in the context of the request AD. For example, in this particular embodiment, the user has access to the global collection COL through execution of a program that may or may not be a dedicated program.

In the example shown in FIG. 8, the notification page NP comprises a title zone 800, a complementary display zone 801 and thumbnail display zones 802, 803 and 804.

Two thumbnails corresponding to two images HR forming the subject of two respective asynchronous requests AD are displayed in the zones 802 and 803. In zone 804 thumbnails are displayed for the other images HR of the list L3.

Zone 800 displays the title TLC of the collection COL with which is associated here a direct link GCL towards the overall collection COL.

In the case of a display of the page NP in an Internet browser, the link GCL has for example the following form:

http://localhost:80/CUID.html, when the HTML page supporting the collection COL is stored in the local file server 114 having the address "localhost".

The thumbnails in zones 802, 803 and 804 comprise associated URL links, LHRm1, LHRm2, and LHRm3 towards the corresponding images HR.

In the algorithm described with reference to FIG. 7, the images HR forming the subject of the asynchronous requests AD are downloaded onto the server system 120 prior to the notification of the requesting client systems 110 and are thus available in a sure manner in the server system 120 at the time of the notification.

In the above case, a URL link, LHRm, will for example take the form:

http://localhost:80/gethighres?iuid=IUID&cuid=CUID, with automatic re-direction of the command "gethighres" to the server system 120:

http://www.centralhost.com/gethighres?iuid=IUID&cuid=CUID.

According to other embodiments of the invention, it is possible for the images HR forming the subject of the asynchronous requests AD not to be systematically downloaded in the server system 120 prior to the sending of the corresponding notifications to the client systems 110. The LHRm links then permit accesses to be made to locations in local file servers 114, where the images HR are available.

According to still another embodiment of the invention, an image HR forming the subject of an asynchronous request AD may be delivered directly, in whole or in part, with the notification to the requesting client system 110.

According to still another embodiment of the invention, the images HR are not solely accessible via the notification page NP. The user may for first of all become acquainted with the new images HR available by viewing the notification page NP, then click on a link GCL of the title of the collection and select the appropriate thumbnails on the header page of the collection (FIG. 4) in order to obtain the requested images HR.

Of course, the present invention is not limited to the details of the embodiments described here by way of example, but on the contrary applies to the modifications within the capability of the person skilled in the art, without departing from the scope of the invention.

Thus, for example, in embodiments of the type of those which have been described above but adapted to the delivery of video data, the commencement of the video stream will for example represent a minimum version of the complete video. The user will request the complete video on the basis of viewing the minimum version.

In other embodiments for the delivery of digital documents for office use, a reduced image of the first page of the document will for example be used as a minimum version on the basis of which the complete document can be requested.

The invention claimed is:

1. A method of asynchronous delivery of digital data implemented in at least one server system and at least one client system connected via a network, said client system receiving deferred delivery of the digital data requested from said server system, comprising steps of:

receiving a request for digital data coming from said client system, wherein the request for the digital data comprises an item identifying context information representing a first state of at least a part of said requesting client system on sending out said request for the digital data;

searching, on the basis of said request, for at least certain of the requested data in at least one of said systems connected to said network; and delivering, by at least one hardware processing unit, a response to said requesting client system at a deferred time, wherein the response incorporates an item similar to said item identifying context information, said requesting client system putting itself at least in part into a second state perceptually similar to said first state, in accordance with said item identifying context information so that the client system display environment of the response according to the second state looks similar to the client system display environment according to the first state from which the request has been sent.

2. A method of asynchronous delivery of digital data implemented in at least one server system connected to at least one client system connected to said server system via a network, said client system receiving deferred delivery of the digital data requested from said server system, comprising steps of:

receiving a request for the digital data coming from said client system and comprising an item of identifying context information representing a first state of at least a part of said requesting client system on sending out said request for the digital data;

searching, on the basis of said request, for at least certain of the requested data in at least one of said systems connected to said network; and delivering, by at least one hardware processing unit, at a deferred time to said requesting client system a response comprising an item similar to said item identifying context information, said requesting client system putting itself at least in part into a second state perceptually similar to said first state so that the client system display environment of the response according to the second state looks similar to the client system display environment according to the first state from which the request has been sent.

3. The method according to claim 2, further comprising: prior to said searching step, a step of:

grouping together of successive requests for data coming from the same client system in the same first state in a single request for data on the basis of which said searching, step is executed; and prior to said delivering step, a step of:
grouping together of several responses to one or more requests for data coming from the same client system in the same first state into a single response to deliver to said same client system.

4. The method according to claim 3, wherein
said step of grouping together of successive requests for data comprises a sub-step of:
deleting a possible redundancy in said successive requests for data.

5. The method according to claim 2, wherein said searching step comprises a sub-step of:
searching for at least certain of said requested data on at least one local file server comprised in a client system other than said requesting client system.

6. The method according to claim 2, wherein said delivering step comprises a sub-step of:
sending said response or a part of it in the form of a notification indicating an availability of said requested data, and said notification comprises at least one link to a location where said requested data are available or partially available and/or at least one link to a set of higher order of which said requested data form part.

7. The method according to claim 2, wherein said delivering step comprises a sub-step of:
loading into said requesting client system of said requested data or a part of them from one or more locations in said server system and/or said at least one client system.

8. A computer-executable program stored in a hardware information storage means, comprising one or more sequences of instructions executable by computer implementing the method according to claim 2.

9. A method of requesting/receiving digital data implemented in at least one client system connected to at least one server system via a network, said client system requesting digital data from said server system and of receiving deferred delivery of said requested digital data after a search for them performed by said server system, comprising steps of:
on sending out said request for the digital data:
generating, by at least one hardware processing unit, an item identifying context information representing a first state of at least a part of said client system on sending out said request for the digital data and associating said item identifying context information with said request for the digital data sent out;
and
on receiving, at a deferred time, a response comprising an item similar to said item identifying context information coming from said server system:
putting at least a part of said client system in a second state perceptually similar to said first state in reaction to said received item identifying context information so that the client system display environment of the response according to the second state looks similar to the client system display environment according to the first state from which the request has been sent.

10. The method according to claim 9, wherein said data may be organized in sets of higher order, said first and second states comprise at least one screen display associated with said data or the execution of at least one computer-executable program associated with said requested data.

11. The method according to claim 9, wherein said data are data of multi-resolution type comprising image data or video data.

12. A computer-executable program stored in a hardware information storage means, comprising one or more sequences of instructions executable by computer implementing the method according to claim 9.

13. A method according to claim 9, in which said data may be organized in sets of higher order, said first and second states comprising at least one screen display associated with said data and the execution of at least one computer-executable program associated with said requested data.

14. A method according to claim 9, in which said data may be organized in sets of higher order, said first and second states comprising at least one screen display associated with said sets of higher order or the execution of at least one computer-executable program associated with said sets of higher order.

15. A method according to claim 9, in which said data may be organized in sets of higher order, characterized in that said first and second states comprise at least one screen display associated with said sets of higher order and the execution of at least one computer-executable program associated with said sets of higher order.

16. A system for asynchronous delivery of digital data incorporated in a distributed manner in at least one server system and at least one client system connected via a network, said client system receiving deferred delivery of the digital data requested from said server system, comprising:
at least one hardware processing unit;
associating means, incorporated in said at least one client system, for associating with a request for the digital data coming from a requesting client system an item identifying context information representing a first state of at least a part of said requesting client system on sending out said request for the digital data;
searching means, incorporated in said server system, for searching, on the basis of said request, for at least certain of the requested data in at least one of said systems connected to said network; and
delivery means, incorporated in said server system, for delivering at a deferred time to said requesting client system a response comprising an item similar to said item identifying context information, said requesting client system putting itself at least in part into a second state perceptually similar to said first state in accordance with said item identifying context information so that the client system display environment of the response according to the second state looks similar to the client system display environment according to the first state from which the request has been sent.

17. An information processing device to operate as a server system connected to at least one client system connected to said server system via a network, said client system receiving deferred delivery of the digital data requested from said server system, comprising:
at least one hardware processing unit;
receiving means for receiving a request for the digital data coming from said client system and comprising an item identifying context information representing a first state of at least a part of said requesting client system on sending out said request for the digital data;
searching means for searching, on the basis of said request, for at least certain of the requested data in at least one of said systems connected to said network; and
delivery means for delivering at a deferred time to said requesting client system a response comprising an item similar to said item identifying context information so that the client system display environment of the response according to the second state looks similar to the client system display environment according to the first state from which the request has been sent.

18. The device according to claim 17, wherein:
said searching means comprise:
grouping means for grouping together successive requests for data coming from the same client system in the same first state into a single request for data; and
said delivery means comprise:
grouping means for grouping together several responses to one or more requests for data coming from the same client system in the same first state into a single response to deliver to said same client system.

19. The device according to claim 18, wherein
said means for grouping together successive requests for data comprise:
deleting means for deleting a possible redundancy in said successive requests for data.

20. The device according to claim 17, wherein said searching means are adapted to perform a search in at least one local file server comprised in a client system other than said requesting client system.

21. The device according to claim 17, wherein said delivery means comprise:
sending means for sending said response or a part of it in the form of a notification indicating an availability of said requested data, and
inserting means for inserting in said notification at least one link to a location where said requested data are available or partially available and/or at least one link to a set of higher order of which said requested data form part.

22. The device according to claim 17, wherein said delivery means comprise:
loading means for loading into said requesting client system said requested data or a part of them from one or more locations in said server system and/or said at least one client system.

23. An information processing device to operate as a client system connected to at least one server system via a network, said client system requesting digital data from said server system and of receiving deferred delivery of said requested digital data after a search for the digital data performed by said server system, comprising:
at least one hardware processing unit;
at the sending end:
generating means for generating, on sending out said request for the digital data, an item of identifying context information representing a first state of at least a part of said client system on sending said request for the digital data, and
associating means for associating said item identifying context information with said request for the digital data sent out; and
at the receiving end:
means for context management for putting at least a part of said client system in a second state perceptually similar to said first state in reaction to said received item identifying context information comprised in a response received from said server system at a deferred time so that the client system display environment of the response according to the second state looks similar to the client system display environment according to the first state from which the request has been sent.

24. The device according to claim 23, wherein said data may be organized in sets of higher order, said context management means comprise means for producing, as part of said first and second states, at least one screen display associated with said data or for executing, as part of said first and second states, at least one computer-executable program associated with said data.

25. The device according to claim 23, wherein said data are data of multi-resolution type comprising image data or video data.

26. A device according to claim 23, in which said data may be organized in sets of higher order, said context management means comprising means for producing, as part of said first and second states, at least one screen display associated with said data and for executing, as part of said first and second states, at least one computer-executable program associated with said data.

27. A device according to claim 23, in which said data may be organized in sets of higher order, said context management means comprising means for producing, as part of said first and second states, at least one screen display associated with said sets of higher order or for executing, as part of said first and second states, at least one computer-executable program associated with said sets of higher order.

28. A device according to claim 23, in which said data may be organized in sets of higher order, said context management means comprising means for producing, as part of said first and second states, at least one screen display associated with said sets of higher order and for executing, as part of said first and second states, at least one computer-executable program associated with said sets of higher order.

* * * * *